Patented Aug. 8, 1950

2,517,543

UNITED STATES PATENT OFFICE 2,517,543

ACETALS OF 2-OXY-TETRAHYDROPYRAN AND TETRAHYDROFURAN-3-ALDEHYDES AND PROCESS OF PREPARING THE SAME

John W. Copenhaver, Easton, Pa., assignor to General Aniline & Film Corporation, New York, N. Y., a corporation of Delaware No Drawing. Application November 5, 1948, Serial No. 58,622

6 Claims. (Cl. 260—333)

This invention relates to a method of reacting orthoesters with cyclic $\alpha, \beta$-unsaturated ethers such as dihydropyran and dihydrofuran, in the presence of an acid reacting condensing agent.

In my copending application Serial No. 719,113, filed December 28, 1946, I have described the production of acetals of 1,3-oxocarbonylic compounds by reacting orthoesters with open chain, $\alpha,\beta$-ethyleneically unsaturated ethers in the presence of an acid reacting condensing agent. I have now discovered that the reaction will be carried out while employing, in place of the open chain vinyl ethers, cyclic vinyl ethers such as dihydrofuran and dihydropyran.

The reaction involved in the present invention may be formulated as follows:

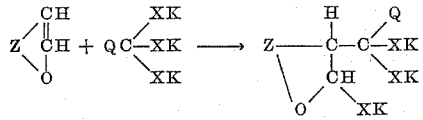

wherein X is a chalcogen of atomic weight less than 33, i. e. oxygen or sulfur, Q is hydrogen or hydrocarbon, preferably alkyl and more preferably lower alkyl, the Ks are radicals of an alcohol or phenol including oxygen or sulfur-interrupted hydrocarbon radicals, or two of the Ks together may be a bivalent radical of a polyhydric alcohol of polythiol, and Z represents —$CH_2$—$CH_2$— or —$CH_2CH_2CH_2$—.

As examples of orthoesters which may be employed in practicing the present invention may be mentioned particularly such orthoformic esters as methyl orthoformic ester, ethyl orthoformic ester, ethyl thio-orthoformate, propyl orthoformic ester and the like, and also the orthoesters of lower fatty acids such as orthoacetates and orthobutyrates. However, if desired, orthobenzoates, orthophenylacetates and related compounds may be employed.

As examples of alcohols whose esters with the orthoacids mentioned above may be employed may be mentioned methyl, ethyl, propyl and butyl alcohols, the lower alkyl orthoesters of lower aliphatic alcohols being preferred. However, if desired, the orthoesters of the acids mentioned above with such alcohols or thiols as cyclohexanol, ethyl mercaptan, benzyl mercaptan, butyl mercaptan, benzyl alcohol, phenyl ethyl alcohol, ethylene glycol, propylene glycol, butylene glycol, 2-thioethanol, phenol, the cresols and the like, may be employed.

While the $\alpha,\beta$-unsaturated ethers employed are generally dihydropyran or dihydrofuran, since the products obtained when employing them form valuable intermediates for condensation into pyrimidine compounds, hydrocarbon substituted dihydropyrans and dihydrofurans may be employed, particularly the $\alpha$-methyl-substituted derivatives.

The catalyst employed in practicing the present invention is, as mentioned, an acid reacting condensing agent. As examples of suitable catalysts there may be mentioned such acid reacting condensing agents as boron trifluoride and its complexes with ether, boron trichloride, stannic chloride, titanium chloride, sulfuric acid and the like. The amount of catalyst is not highly critical and may be varied from mere traces to about 0.1 mol of catalyst per mol of orthoester. However, for best results, employing a catalyst like boron trifluoride, amounts within the range of 0.0001 to 0.01 mol of catalyst per mol of orthoester are employed.

It has been found that the reaction is operable through a relatively wide temperature range and no critical limits for temperature have been established. However, while temperatures below 0° C. are operative, no advantage has been found in employing lower temperatures and likewise temperatures above about 50° C. are preferably avoided, since there is no advantage in their use, although the process is operative at temperatures of 100° C. or even higher. When the temperature employed is above the boiling point of any of the reactants, the process can advantageously be carried out under superatmospheric pressure; otherwise, atmospheric pressure may be employed.

The following examples, in which parts are by weight, illustrate specific embodiments of the invention:

Example I

To a glass reactor fitted with a sealed stirrer, condenser, thermometer and dropping funnel there were added 3552 parts (24 mols) of ethyl orthoformate and 3.2 parts (0.001 mol per mol of orthoester) of boron trifluoride diethyl ether complex. To this mixture there were slowly added 672 parts (8 mols) of dihydropyran during the course of 15 hours. The reaction was exothermic and the temperature was held at approximately 35° C. by periodic cooling. After the last of the dihydropyran had been added, the reaction mixture was stirred for 4 hours at room temperature and the catalyst then neutralized by the addition of 7.5 parts of diethanolamine. The excess ethyl orthoformate was then removed by distillation and there was obtained 1524 parts (82% of theory) of 2-ethoxy tetrahydropyran-3-aldehyde diethyl acetal (boiling point 123–124° C./17 mm., $n_D^{25}$ 1.4324) and having the formula

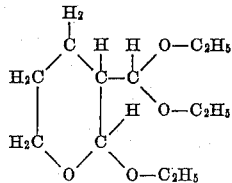

Analysis calculated for $C_{12}H_{24}O_4$: C, 62.04; H, 10.41. Found: C, 62.25; H, 10.31.

*Example II*

To a glass reactor similar to that used in Example I and equipped with a sealed stirrer, condenser, thermometer and dropping funnel, there were added 63 parts (0.425 mol) of ethyl orthoformate and 8.1 parts of boron trifluoride diethyl ether complex. To this mixture there were then added, dropwise, during 15 minutes, 9 parts (0.129 mol) of dihydrofuran. The reaction was exothermic and the temperature was held below 45° C. by cooling. On completion of the addition of the dihydrofuran, the reaction mixture was stirred for 2.5 hours at room temperature and the catalyst was then neutralized by the addition of 1 part of diethanolamine. The reaction mixture was then distilled, the excess ethyl orthoformate first being distilled over, and there was recovered 20.5 parts (76% of theory) of 2-ethoxy-tetrahydro-3-furaldehyde diethyl acetal (boiling point 110° C./13 mm., $n_D^{25}$ 1.4250, and having the formula

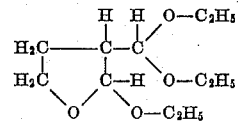

I claim:
1. The process which comprises reacting a compound selected from the group consisting of orthoesters and orthothioesters with an α,β-unsaturated cyclic ether selected from the group consisting of dihydropyran and dihydrofuran and their α-methyl homologues at a temperature of from 0–100° C. in the presence of an acid reacting condensing agent.
2. The process as defined in claim 1, wherein the compound reacted with the cyclic unsaturated ether specified is a lower alkyl orthoester.
3. The process as defined in claim 2, wherein the compound reacted with the cyclic unsaturated ether specified is a lower alkyl orthoformic ester.
4. Lower alkyl acetals of 2-lower alkoxy tetrahydropyran-3-acetal.
5. Lower alkyl acetals of 2-lower alkoxy tetrahydro-3-furaldehyde.
6. Acetals selected from the group consisting of lower alkoxy acetals of 2-lower alkoxy tetrahydropyran and tetrahydrofuran 3-aldehydes.

JOHN W. COPENHAVER.

No references cited.